United States Patent

[11] 3,569,678

[72] Inventor Gunter Emde
Neubiberg, Germany
[21] Appl. No. 634,617
[22] Filed Apr. 28, 1967
[45] Patented Mar. 9, 1971
[73] Assignee Bolkow G.m.b.H.
Munich, Germany

[54] STATIC COUNTER
9 Claims, 5 Drawing Figs.

[52] U.S. Cl. .......... 235/92, 307/222, 328/44, 328/48
[51] Int. Cl. .......... G06m 3/04, H03k 21/16
[50] Field of Search .......... 307/222; 328/44, 48; 235/92

[56] References Cited
UNITED STATES PATENTS

| | | | |
|---|---|---|---|
| 3,443,071 | 5/1969 | Petzold | 235/92 |
| 3,356,953 | 12/1967 | Petzold | 328/44 |
| 3,414,719 | 12/1968 | Pelzold | 235/92 |
| 3,354,295 | 11/1967 | Kulka | 235/92 |
| 3,114,883 | 12/1963 | Arthur | 328/44 |

*Primary Examiner*—Maynard R. Wilbur
*Assistant Examiner*—Robert F. Gnuse
*Attorney*—McGlew and Toren

ABSTRACT: A static counter for forward and backward counting comprises a plurality of counting stages each of which includes a prestorage portion and a main storage portion. In advance of the counter for the first binary digit, there is connected an input gate circuit which indicates any change of state of the counting signal for the first binary digit, that is, whether the counting is to be changed from forward to backward or vice versa. The binary digit stages succeeding the first binary digit stage are controlled by the storage state of the respective immediately preceding counting stage.

Inventor:
Günter Emde
by McGlew and Toren
Attorneys

Inventor:
Günter Emde
McGlew and Toren
by Attorneys

Inventor:
Günter Emde
McGlew and Toren
by Attorneys

Inventor:
Günter Emde
by McGlew and Toren
Attorneys

STATIC COUNTER

BACKGROUND OF THE INVENTION

The invention is directed to counters and, more particularly, to a novel static counter which can count forwards and backwards with any desired presetting and including a plurality of counting stages, each of which has a prestorage and a main storage indicating the counting result of a binary digit.

Static counters are superior to conventional dynamic counters by virtue of their greatly decreased susceptibility to trouble from short-time disturbance pulses. Recently, such static counters have been used to an increasing extent. Static counters which can count forwards or backwards are known. Thus, a counter disclosed in published German Pat. application No. 1,205,147, for example, has a counting stage for each binary digit, and each counting stage includes a prestorage and a main storage. This particular counter requires, in addition to the counting signal, which is a pulselike input signal, a so-called "auxiliary counting signal" which is necessary for internal switching processes. For example, it is necessary to transfer the main storage content of a counting stage into the prestorage of the following counting stage.

This known static counter, however, does not permit automatic change from one counting direction to the other, such as from forward counting to backward counting or vice versa. Instead, the counter must first be erased for a change in counting direction, and then set individually to the desired counting state for the new counting direction. Only after this can a pulse series be processed in the new counting direction.

Dynamic counters are know, for example, from published German Pat. application 1,195,975, wherein the counter automatically takes into consideration a change of counting direction during the counting process. In these dynamic counters, all of the counting stages receive a counting direction signal over special signal lines. This has the disadvantage that, during changes of the counting direction which follow each other faster than all of the counting stages can be set, the new counting direction signal is combined with the old counting pulses in the higher counting stages, so that completely uncontrollable carries are formed.

In order to obtain correct carries from one counting stage to the other, it is known to control only the first counting stage with the counting pulses proper. By the counting pulses proper is meant the input signals. All other counting stages are set by the respective preceding counting stage. For example, all shift registers work on this principle, but it is not possible therein to change the counting direction automatically in dependence on the input signal.

Another disadvantage of all hitherto known counters is that they cannot determine an input signal with the highest possible resolving power. Consequently, a rectangular pulse series is so counted, for example, that each pulse as a whole represents one counting step. Separating counting of the front and rear flanks of a pulse, as separate counting steps, is not possible. Thus, presently known static counters count only every second static change of state of the input signal.

Digital position indicators for indicating a rotary movement by emitting a certain pulse sequence, and designed as so-called "increment indicators" work, by way of example, with segments staggered by 90°. Thus, two pulse sequences, phase-shifted by 90°, can be taken from the output of the increment indicator. These two pulse sequences are so evaluated by a logical network, such as described, for example, in my copending U.S. Pat. application Ser. No. 618,834, filed Feb. 24, 1967, that separate pulse sequences are formed depending upon the direction. Furthermore, the high resolving power obtained by the increment indicator having the thus staggered segments is maintained.

It would be desirable to count these pulse sequences with a static counter so that the resolving power is maintained, to which end it is necessary, however, to count the front and rear flanks of each counting pulse.

SUMMARY OF THE INVENTION

The present invention is directed to the provision of a static counter which permits reliable counting in both counting directions with the highest possible resolving power of a pulse sequence available as an input signal, and wherein a change of direction of the counting process is recognized automatically by the counter and taken into consideration without delay.

In accordance with the invention, this is attained in a static counter for forward and backward counting by providing a switching stage associated with the first binary digit as an input gate-circuit indicating every state of a counting signal. The binary digit counting stages proper follow this input gate-circuit, and of these stages, the second to the *n*th counting stages can be controlled both for continued counting and for the automatic determination of the counting direction by the switching states of the storages of the respective immediately preceding counting stages. The input counting stage immediately following the input gate-circuit can be set according to the state of the input gate-circuit to which it is connected in series.

By virtue of the fact that the input counting stage provides a directional signal, in addition to the first increment required for setting this stage, the prestorage and the main storage are admitted or fed in an exactly defined manner. The following counting stage is stepped up from the state-combination of these two storage contents without the following stage requiring a counting direction signal. All of the following counting stages of the static counter work in a similar manner.

The arrangement of the invention has the advantage that two opposed counting direction signals do not lead to counting errors in the higher counting stages, even when they succeed each other very closely, since all that is necessary to take into consideration the new counting direction is to set the input counting stage correctly. The additional counting stages following the input counting stage are stepped up independently of any possible change of direction in the input counting stage and merely to the extent of the storage content of the respective immediately preceding counting stage.

The first and lowest binary digit $Z_0$ is derived directly from the input gate-circuit of the counter, while the input counting stage is set by means of the additional counting direction signal derived from the counting signal. The counting directional signal is designated R for backward counting and R for forward counting. The states of the outputs of the prestorage of a counting stage are $Z_{01}$, and $Z_{01}$, respectively. The states of the outputs of the main storage of a counting stage are $Z_1$ and $Z_1$, and the states at the setting input of the prestorage are designated $Z'_1$ and $Z'_1$, the index 1 indicating the ordinal number of the respective counting stage to which the storages belong.

The input counting stage, having the states $Z_{01}$ and $Z_{01}$ for the outputs of the prestorage and the states $Z_1$ and $Z_1$ for the outputs of the main storage, assumes a separate position in the counter, since its storages are set in dependence on the first binary digit $Z_0$ and $Z_0$, respectively, determined by the input gate-circuit, and of the respective counting directional signal R and R. The following logical functions apply for the prestorage:

$$Z_{01}=\overline{\overline{((\overline{R}\wedge Z_0\wedge\overline{Z}_1)\,v\,(R\wedge\overline{Z}_0\wedge Z_1))}\wedge v_{e_2}\wedge\overline{Z}_{01}}$$

$$\overline{Z}_{01}=\overline{\overline{((\overline{R}\wedge Z_0\wedge Z_1)\,v\,(R\wedge\overline{Z}_0\wedge\overline{Z}_1))}\wedge v_{e_1}\wedge Z_{01}}\qquad(1)$$

For the main storage, the following logical functions apply:

$$Z_i=\overline{\overline{((\overline{R}\wedge\overline{Z}_0\wedge Z_{01})\,v\,(R\wedge Z_0\wedge Z_{01}))}\wedge v_{e_1}\wedge\overline{Z}_1}$$

$$\overline{Z}_i=\overline{\overline{((R\wedge Z_0\wedge Z_{01})\,v\,(\overline{R}\wedge Z_0\wedge Z_{01}))}\wedge v_{e_3}\wedge Z_1}\qquad(2)$$

For all other counting stages following the input counting stage, the following logical functions apply:

Prestorage $$Z_{0i}=\overline{\overline{((Z_{0.i-1}\wedge Z_{i-1}\wedge Z_i)\,v\,(Z_{0.i-1}\wedge Z_{i-1}\wedge\overline{Z}_i))}\wedge v_{e_2}\wedge\overline{Z_{0i}}}$$

$$\overline{Z}_{0i}=\overline{\overline{((Z_{0i-1}\wedge Z_{i-1}\wedge Z_i)\,v\,(Z_{0.i-1}\wedge Z_{i-1}\wedge Z_i))}\wedge v_{e_1}\wedge Z_{0i}}$$

(3)

Main Storage $$Z_i=\overline{\overline{((\overline{Z}_{0.i-1}\wedge\overline{Z_{i-1}}\wedge Z_{0i})\ v(\overline{Z}_{0.i-1}\wedge Z_{i-1}\wedge\overline{Z}_{0i}))}\wedge v_{e_4}\wedge\overline{Z}_i}$$

$$\overline{Z}_i=\overline{\overline{((\overline{\overline{Z}_{0.i-1}}\wedge\overline{\overline{Z}_{i-1}}\wedge\overline{\overline{Z}_{0i}})\ v(\overline{\overline{Z}_{0.i-1}}\wedge Z_{i-1}\wedge Z_{0i}))}\wedge v_{e_3}\wedge Z_i} \quad (4)$$

The counting directional signals R and $\overline{R}$ are thus no longer required in the counting stages except the input counting stage.

In accordance with another feature of the invention, the input gate-circuit preceding the input counting stage is so designed that it can be preset as to which state of the counting signal is to be evaluated as an 0 signal and which as a L signal. This is necessary, particularly with counting signals originating for the above-mentioned increment indicator, for example, an angle indicator, which is able to provide an L signal already in a starting position.

In order to prevent that, with very rapidly succeeding counting direction changes, an increment which has passed through the input gate-circuit is combined in the output counting stage with a new counting direction not belonging to this increment, delay members are inserted into the counting-direction signal lines, in accordance with another feature of the the invention. The input gate-circuit is so connected to the input lines that the respective first increment, immediately following each reversal of the counting direction, is suppressed.

Accordingly, an object of the present invention is to provide an improved static counter for forward and backward counting.

Another object of the invention is to provide an improved static counter which permits reliable counting in both counting directions with the highest possible resolving power of a pulse sequence available as an input signal.

A further object of the invention is to provide an improved static counter wherein a change of counting direction is recognized automatically by the counter and taken into consideration with without delay.

Still another object of the invention is to provide an improved static counter for forward and backward counting in which the switching stage associated with the first binary digit is an input gate-circuit indicating every state of a counting signal.

A further object of the invention is to provide an improved static counter of the type just mentioned in which a series of counting stages follow the input gate-circuit, and in which the *n*th counting stage can be controlled, both for continued counting and for automatic determination of the counting direction, by the switching states of the storages of the respective immediately preceding counting stages.

Still another object of the invention is is to provide an improved static counter of the type just mentioned in which the input counting stage immediately following the input gate-circuit can be set according to the state of the input gate-circuit to which it is connected in series.

A further object of the invention is to provide a static counter including an input gate-circuit in advance of an input counting stage, and in which the input gate-circuit can be preset as to which state of the counting signal is to be evaluated as an O signal and which as a L signal.

Another object of the invention is to provide an improved static counter of the type mentioned and in which delay members are inserted into the counting-direction signal lines to prevent an increment, which has already passed through the input gate-circuit, being combined in the output counting stage with a new counting direction not belonging to this increment, in the case of very rapidly succeeding counting direction changes.

A further object of the invention is to provide such a static counter as just mentioned in which the input gate-circuit is so connected to the input lines that the respective first increment immediately following each reversal of the counting direction is suppressed.

BRIEF DESCRIPTION OF THE DRAWINGS

For an understanding of the principles of the invention, reference is made to the following description of typical embodiments thereof as illustrated in the accompanying drawings.

In the Drawings.

DESCRIPTION OF THE PREFERRED EMBODIMENTS

Figure 1:
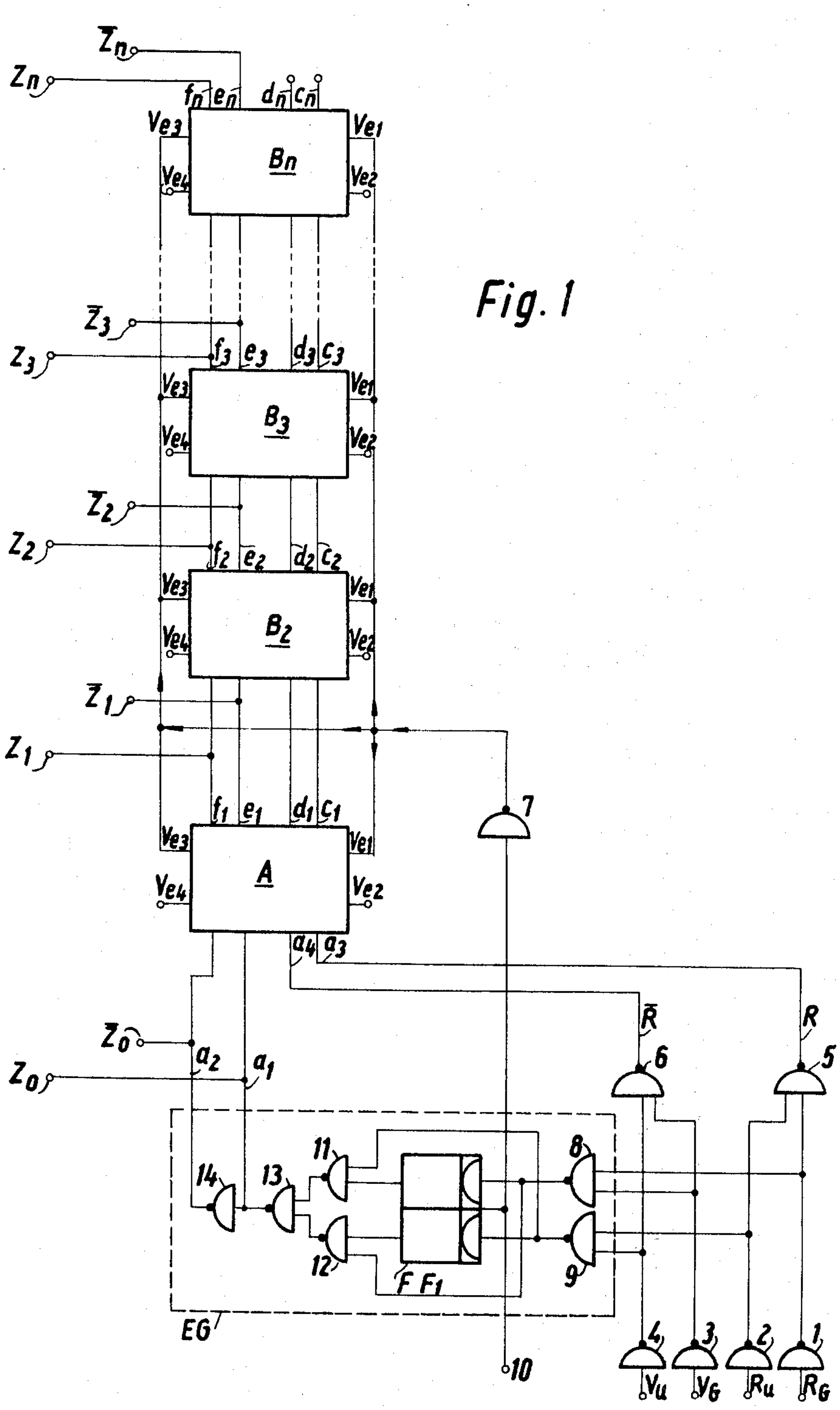
FIG. 1 is a schematic block diagram of a static counter embodying the invention.

In the static counter embodying the invention and illustrated in FIG. 1, input signals are available from a logical network which has not been shown. These input signals are available at the NAND members 1, 2, 3 and 4, and are separated according to counting direction. The static counter comprises in an input gate-circuit EG, an input counting stage *A*, and individual additional counting stages *B* connected behind or after the input counting stage *A*. The input gate-circuit EG is connected with the four outputs of the NAND members 1, 2, 3 and 4. Also, the outputs of NAND members 1 and 2 are connected as inputs of a NAND member 5, and the outputs of NAND members 3 and 4 are connected with the inputs of a NAND member 6, the outputs of NAND members 5 and 6 being connected with the counting stage *A*.

Input gate-circuit EG comprises two input NAND members 8 and 9, a so-called RS flip-flop FF1, and NAND members 11, 12, 13 and 14. The two inputs of NAND member 8 are connected with the outputs of NAND members 1 and 3, and the two inputs of NAND member 9 are connected with the outputs of NAND members 2 and 4. The output of each NAND member 8 and 9 is connected to a respective input of flip-flop FF1. This flip-flop operates in a manner such that the input signals available at its two inputs, which originate from the outputs of NAND members 8 and 9, are transmitted to flip-flop FF1 only when there is also a signal at a zero setting input 10. The two outputs of the double flip-flop FF1 are connected to respective NAND members 11 and 12, the second input of NAND member 11 being connected with the output of NAND member 9 and the second input of NAND member 12 being connected with the output of NAND member 8. The outputs of NAND members 11 and 12 are connected to the inputs of NAND member 13, and the output of NAND member 13 is connected to the input of a NAND member 14. Output $a_1$ of NAND member 13 is also brought out to indicate the value of the lowest and last binary digit $Z_0$, and output $a_2$ of NAND member 14 is brought out to indicate the value $Z_0$. A signal at the zero setting input 10 is inverted in NAND member 7 and supplied to two inputs $V_e$ of the various counting stages mentioned hereinafter.

The outputs $a_1$ and $a_2$ of the input gate-circuit EG are supplied to the input counting stage *A* wherein, at the same time, the result of the first or lowest binary digit is available at outputs $Z_0$ and $\overline{z}_0$. Input counting stage *A* is connected by lines $c_1$, $d_1$, $e_1$ and $f_1$ with the following or second counting stage $B_2$, and all of the following counting stages $B_3$ to $B_n$ are connected with each other in the same manner as the stage $B_2$ is connected to the stage *A*.

Two output lines of input counting stage *A*, namely lines $e_1$ and $f_1$, and two output lines of the other counting stages $B_2$ through $B_n$, namely $e_i$ and $f_i$ are brought out and indicate the counter reading of the respective binary digit of the several counting stages. Input counting stage *A* and the other counting stages $B_2$ through $B_n$ also have four additional inputs $V_e$ at which the prestorages and the main storages of each individual counting stage are preset at will. Each stage has two of these additional inputs connected with each other and to the output of NAND member 7 in a manner such that they permit the zero setting of the entire counter.

Figure 2:
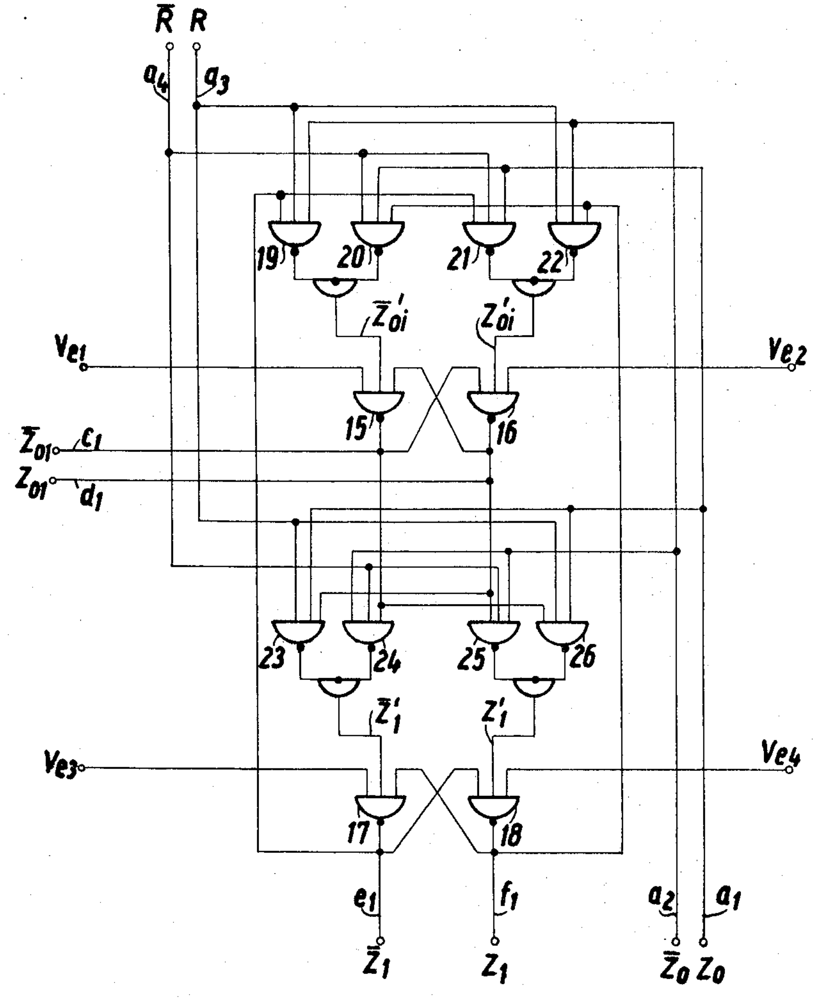
FIG. 2 is a schematic wiring diagram of an input counting stage of the static counter, and including NAND members.

Referring to the schematic wiring diagram of FIG. 2, input counting stage *A* comprises two NAND members 15 and 16 forming the prestorage thereof and two NAND members 17 and 18 forming the main storage thereof. Input counting stage *A* has two inputs $a_3$ and $a_4$ for the counting directional signals $\bar{R}$ and R, two inputs $V_{e1}$ and $V_{e2}$ for presetting the prestorage comprising the NAND members 15 and 16, two inputs $V_{e3}$ and $V_{e4}$ for presetting the main storage comprising the NAND members 17 and 18 and two inputs which are connected with the outputs $a_1$ and $a_2$ of the input gate-circuit EG and which indicate the respective state $Z_0$ or $\bar{Z}_0$ of the input gate-circuit EG. The outputs of NAND members 15 and 16 are brought out as outputs $c_1$ and $d_1$, and indicate the switching states $Z_{01}$ and $\bar{Z}_{01}$ of the prestorage. Similarly, the outputs of NAND members 17 and 18 are brought out as outputs $e_1$ and $f_1$ and indicate the switching states $Z_1$ and $\bar{Z}_1$ of the main storage of counting stage *A*. NAND members 15 and 16 of the prestorage of counting stage *A* have inputs supplied through NAND members 19, 20, 21, and 22. Of the three inputs of NAND member 19, one is connected with the 'counting directional signal input $a_3$, one with the input $a_2$ and one with the output $e_1$ of NAND member 17 of the main storage of counting stage *A*. Of the three inputs of NAND member 20, one is connected with the counting directional signal input $a_4$, one with the input $a_1$ and one with the output $f_1$ of NAND member 18 of the main storage of counting stage *A*. The outputs of NAND members 19 and 20 are simply combined with the so-called DPL technique used in switching networks, this combination of the output of two NAND members having the logical function of an AND member (wired AND) and the combined outputs are connected with an input of NAND member 15 of the prestorage of counting stage *A*.

NAND member 21 also has three inputs, one connected with the counting directional signal $a_4$, one with the input $a_1$ and one with the output $e_1$ of NAND member 17. Similarly, NAND member 22 has one input connected with the counting directional signal input $a_3$, one with input $a_2$ and one with the output $f_1$ of NAND member 18. The outputs of NAND members 21 and 22 are combined in a like manner to the outputs of NAND members 19 and 20, aNd the combined outputs connected with an input of NAND member 16 of the prestorage of counting stage *A*.

NAND member 15 has three inputs, the second of which is connected with an input $V_{el}$ for presetting the third with the output of NAND member 16. The second input of NAND member 16 is connected with another input $V_{e2}$ for presetting and its third input is connected with the output $c_1$ of NAND member 15.

NAND members 17 and 18 o the main storage of counting stage *A* have their inputs supplied through NAND members 23, 24, 25 and 26. The NAND member 23 has three inputs, one connected with the counting directional signal $a_3$, one with the input $a_1$ and one with the output $d_1$ of NAND member 16. NAND member 24 also has three inputs, one connected with the counting direction signal input $a_4$, one with input $a_2$ and one with the output $c_1$ of NAND member 15. In the same manner as previously described, the outputs of NAND members 23 and 24 are combined and connected with one input of NAND member 17.

NAND member 25 has three inputs, one cone connected with counting direction signal input $a_4$, one with input $a_2$ and one with the output $d_1$ of NAND member 16. NAND member 26 likewise has three inputs, one connected with the counting direction signal input $a_3$, one with input $a_1$ and one with the output $c_1$ of NAND member 15. The outputs of NAND members 25 and 26 are combined in the manner previously described, and connected with one input of NAND member 18.

The second input of NAND member 17 is connected with an input $V_{e3}$ for presetting, and its third input is connected with the output of NAND member 18. The second input of NAND member 18 is connected with another input $V_{e4}$ for presetting, and its third input with the output of NAND member 17.

In rest position, NAND members 15 and 16 are charged as follows: NAND member 15 receives, over its input $V_{e1}$ and as a rest signal, an L signal and, from the combination of the outputs of NAND members 19 and 20, an O signal. This is since it is assumed that an L signal appears at the counting direction signal input $a_3$ and thus an O signal at the input $a_4$, together with an O signal at the input $a_1$ and an L signal at the input $a_2$, simultaneously with the appearance at the output $e_1$ of NAND member 17 of an L signal. NAND member 16 is charged at the input $V_{e2}$ with an L signal, and is charged, from the combination of the outputs of NAND members 21 and 22, with an L signal, since the output $a_1$ of NAND member 21 carries an O signal, the output $a_4$ an O signal and the input $e_1$ an L signal. The AND condition for NAND member 21 is thus not satisfied. NAND member 22 has its inputs charged with an O signal at the input $f_1$, an L signal at the input $a_2$ and an L signal at the input $a_3$. Thus, the AND condition of NAND member 22 likewise is not satisfied, and an L signal consequently appears at the outputs of NAND members 21 and 22 and thus at the input of NAND member 16.

Since the input of NAND member 15 connected with the combined outputs of NAND members 19 and 20 receives an O signal, the AND condition for NAND member 15 is not satisfied and thus an L signal appears at its output. The input of NAND member 16 connected with the output of NAND member 15 thus also receives an L signal, so that the AND condition of NAND member 16 is satisfied and an O signal appears at its output. Since the output of NAND member 16 is also connected with an input of NAND member 15 so that this latter input receives an O signal, nonsatisfaction of the AND condition for NAND member 15 is assured independently of the other two input signals of this NAND member so long as the AND condition of NAND member 16 is satisfied. The two NAND members 15 and 16 thus replace, in the illustrated wiring wiring, a flip-flop circuit whereby it is positively assured that one output carries the inverted signal of the other output.

NAND members 17 and 18, forming the main storage of counting stage *A*, are charged in a similar manner by NAND members 23, 24, 25 and 26 and the inputs of stage *A*. Thereby, an O signal appears, in the rest position, at the output $f_1$ of NAND member 18 and the indicated binary digit of input counting stage *A* thus is a zero. The interconnection of the individual NAND members of the input counting stage *A*, as shown in FIG. 2, is so selected that the logical functions, mentioned above for input counting stage *A*, are satisfied. That is, in forward counting $\bar{R}$, the following carries take place between the prestorage and main storage of input counting stage *A*:

$$\text{If } Z_0 = L: Z_1 \rightarrow \bar{Z}_{01} \qquad (5)$$
$$\text{if } Z_0 = O: Z_{01} \rightarrow Z_1.$$

In backward counting R, the following carries take place:

$$\text{if } Z_0 = L: \bar{Z}_{01} \rightarrow Z_1 \qquad (6)$$
$$\text{if } Z_0 = O: Z_1 \rightarrow Z_{01}$$

Figure 3:
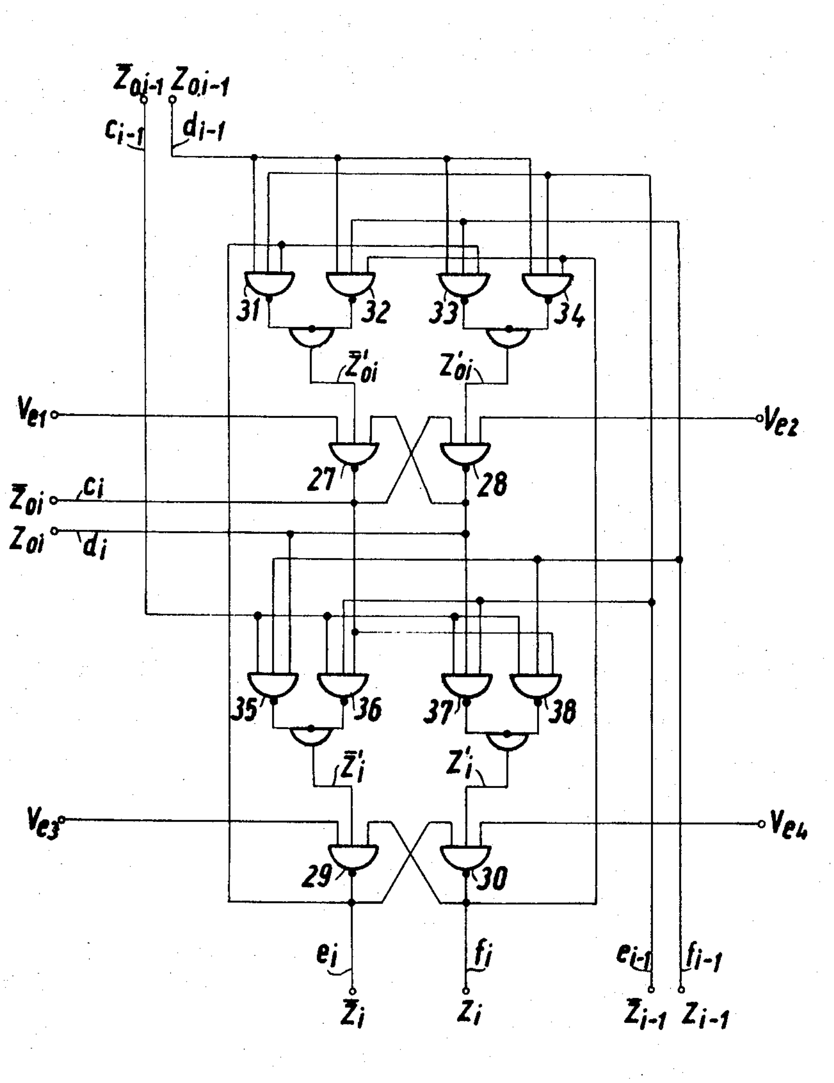
FIG. 3 is a schematic wiring diagram of the counting stages succeeding the input counting stage, and again comprising NAND members.

FIG. 3 shows the internal wiring of the NAND members of one of the identical counting stages *B*, the individual NAND members being wired with each other in a manner similar to that for input counting stage *A* and as shown in FIG. 2. A counting stage *B* likewise has four inputs $V_e$ for presetting, and two inputs $e_{i1}$ and $f_{i-1}$ for the States $\bar{Z}_{i1}$ and $Z_{i1}$, respecively, of the main storage of the respective preceding counting stage. Instead of the inputs $a_3$ and $a_4$ for the counting direction signals R and $\bar{R}$ provided in input counting stage *A*, each counting stage *B* has two inputs $c_{i1}$ and $d_{i1}$ at which appear the respective states $\bar{Z}_{0i1}$ and $Z_{0i1}$ of the prestorage of the respective preceding counting stage. Each counting stage *B* also has four outputs, namely outputs $c_i$ and $d_i$ indicating the respective states $\bar{Z}_{0i}$ and $Z_{0i}$ and $e_1$, $f_i$ which indicate the respective states $\bar{Z}_i$ and $Z_i$ of its main storage.

As a prestorage, each counting stage *B* has NAND members 27 and 28 which are charged by NAND members 31, 32, 33 and 34, and the main storage includes two NAND members 29 and 30 which are charged from NAND members 35, 36, 37 and 38. The individual NAND members in each counting stage *B* are interconnected with each other in a manner similar to the interconnection of the NAND members of the input counting stage *A* as shown in FIG. 2, except that the logical functions applying to each counting stage *B* which have already been mentioned, are not satisfied.

In dependence on the states of the prestorage and the main storage of the respective preceding counting stage, the following carries, between the prestorage and the main storage of each counting stage *B*, take place:

$$\begin{aligned} &\text{If } Z_{O.i11} = 0 \text{ and } Z_{i11} = 0 : Z_{0i} \rightarrow Z_i \qquad (7)\\ &\text{if } Z_{O.i11} = 0 \text{ and } Z_{i11} = 1 : \bar{Z}_{Oi} \rightarrow Z_i\\ &\text{if } Z_{O.i11} = 1 \text{ and } Z_{i11} = 0 : Z_i \rightarrow Z_{0i}\\ &\text{if } Z_{O.i11} = 1 \text{ and } Z_{i11} = 1 : \bar{Z}_i \rightarrow Z_{0i} \end{aligned}$$

Figure 4:
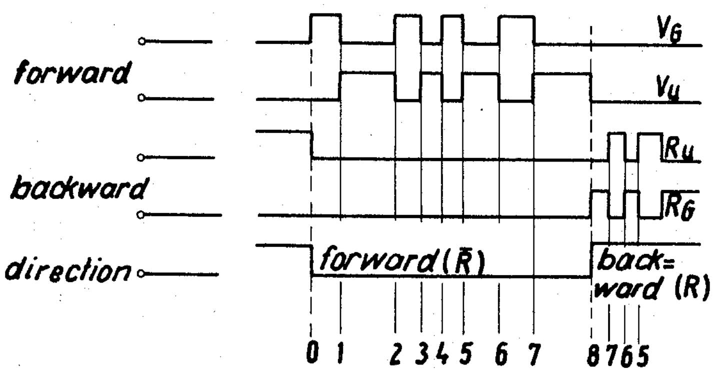
FIG. 4 is a pulse diagram of the input signal available at the input of the counter.

At the input NAND members 1, 2, 3 and 4 of the static counter, there are applied input signals formed by a logical network (not shown) from the signals of an increment indicator (not shown) and which are represented in the pulse diagram of FIG. 4. Depending on the direction, pulse sequences appear on the lines $V_G$ and $V_{U}$ for forward counting and on the lines $R_G$ and $R_U$ for backward counting or movement of the increment indicator. From the two forward movement or counting signals, there is derived, through NAND member 6, a counting direction signal indicating the forward counting direction, and this is applied to the input counting stage *A*. The backward counting signals are combined by NAND member 5 to form a counting direction signal for backward counting and also applied to input counting stage *A*. Input counting stage *A* thus receives the counting directional signals represented in the bottom line of the pulse diagram of FIG. 4.

Let it be assumed that a position indicator (not shown) is in a state of rest before the start of a counting operation, and in a position such that the input of the static counter is so charged, over a logical network (not shown), that an O signal appears on line $R_G$, and an L signal on line $R_U$, an O signal on line $V_G$ and an O signal on line $V_U$. With this signal distribution, the AND condition is satisfied for NAND member 8, so that an O signal appears at its output and is applied to the input of flip-flop FF1. However, a the AND condition is not satisfied for NAND member 9, since there is an O signal at the output of NAND member 2. Thus, an L signal appears at the output of NAND member 9 and is applied to the other input of flip-flop FF1.

If a counting operation is now to be started, the entire static counter is erased, or reset to zero, by charging zero setting input 10. Simultaneously, the signal from zero setting input 10 is applied to flip-flop FF1, so that the L signal at its input connected to the output of NAND member 9 is stored in the flip-flop and the output of the flip-flop connected with NAND member 12 has an L signal appearing thereat. NAND member 11, however, receives an O signal from the output of the flip-flop connected thereto, so that an L signal always appears at such output and independent of the form of the signal applied to the second input of this NAND member, since the AND condition of NAND member 11 is not satisfied. An L signal also appears at the output of NAND member 12, since the second input thereof connected with the output of NAND member 8 receives an O signal so that the N AND condition for NAND member 12 is thus not satisfied. The AND condition is satisfied, however, for NAND member 13, so that an O signal appears at its output $a_1$ and which indicates at the same time the value of the first binary digit $Z_0$. An L signal appears at the output $a_2$ of the single input NAND member 14, since an O signal appears at the output of NAND member 13.

If the position indicator is now moved in a forward direction, an L signal appears on line $V_G$, while the L signal on line $R_U$ disappears, as will be noted from FIG. 4. The appearance of the O signal at the output of NAND member 3 has the effect that the AND condition for NAND member 8 is no longer satisfied, and the L signal consequently appears at its output. However, the AND condition is not satisfied for NAND member 9, and an O signal appears at its output. These signals, which are also supplied to the inputs of flip-flop FF1, are without significance for the outputs of the flip-flop since an input signal can be processed by the flip-flop only in combination with a signal from the zero setting input 10.

NAND member 12 now receives, at its second input connected with the output of NAND member 8, an L signal so that the AND condition for NAND member 12 is satisfied and an O signal appears at its output and is applied to NAND member 13. However, the AND condition for NAND member 13 is no longer satisfied, so that an L signal appears at its output $a_1$ and at the same time for the lowest binary digit $Z_0$. This L signal is inverted through NAND member 14, so that an O signal appears at the output $a_2$.

These signals emitted by input gate-circuit EG, which simultaneously indicate the counter reading of the lowest binary digit of the counter, arrive at input counting stage *A* and there effect, with a counting direction signal $\bar{R}$, setting of the prestorage. In a following counting increment, as applied to the input of the counter, input gate-circuit EG changes its switching state in a manner similar to that described in connection with FIG. 1, and thus changes its output signals so that the storage content of the prestorage is carried into the main storage of counting stage *A*, according to the logical functions applied to input counting stage *A*. The switching of the respective counter readings is effected independence on the storage contents of input counting stage *A* or on the storage contents of the respective immediately preceding counting stage *B*. Starting with a counter reading zero, the carry from one counting stage to the next and between prestorage and main storage of the respective counting stages will now be described on the basis of the following table for forward and backward counting:

000 = 0
0000
00L = 1
000L
0LL = 2
00L0
0L0 = 3
00LL
LL0 = 4
0L00
LLL = 5
0L0L
L0L = 6
0LL0
L00 = 7
0LLL
Loo = 8
L000
L00 = 7
OLLL
L0L = 6
0LL0

| | | | |
|---|---|---|---|
| L<br>O<br>$B_3$ | L<br>L<br>$B_2$ | L<br>O<br>A | =5<br>L<br>EG |
| $Z_{03}$<br>$Z_3$ | $Z_{02}$<br>$Z_2$ | $Z_{01}$<br>$Z_1$ | $Z_0$ |

For each digit, the upper line indicates the storage contents of the prestorage of the respective counting stage, and the bottom line the storage contents of the main storage of the respective counting stage. The last and lowest digit in each bottom line indicates the respective output signal $Z_0$ of input gate-circuit EG. In addition to the storage contents of the individual counting stages as represented in two lines, there is also shown the associated decimal equivalent of the respective binary counter reading.

As can be seen, the state of input gate-circuit EG changes, in passing from one counting stage to the other, only by the alternate appearance of an O or an L signal. From this output signal of input gate-circuit EG, there is formed, under the above-mentioned condition, and in accordance with the respective counting direction, a carry in the following column which indicates the storage contents $Z_{01}$ and $Z_1$ of input counting stage *A*. The other two columns indicate the storage contents $Z_{02}$ and $Z_2$, and $Z_{03}$ and $Z_3$, respectively, of the following two counting stages *B* wherein the carries are formed according to the above-mentioned conditions applying to the counting stages *B*, depending on the storage contents in the input counting stage *A*.

After the reading of the static counter has reached 8, input counting stage *A* receives a counting direction signal R, so that the storage contents are now formed, from the state of the input gate-circuit, in accordance with the conditions applying to backward counting. For the carries of the storage contents in counting stages *B*, nothing is changed since these are still formed according to the same conditions and from the storage contents of the input counting stage *A*. If the static counter is charged with counting increments in a backward counting beyond the counter reading of zero, the individual counting stages form negative counter readings in accordance with the conditions applying to backward counting. As an example, there is indicated here the storage contents in binary counter readings corresponding to negative decimal numbers, where the highest stage $B_n$ can be considered as the carrier of the sign:

```
0L0  =  −4     (8)
LL00
0LL  =  −3
LL0L
00L
LLL0  =  −2
000  =  −1
LLLL
000  =  0
0000
```

Figure 5:
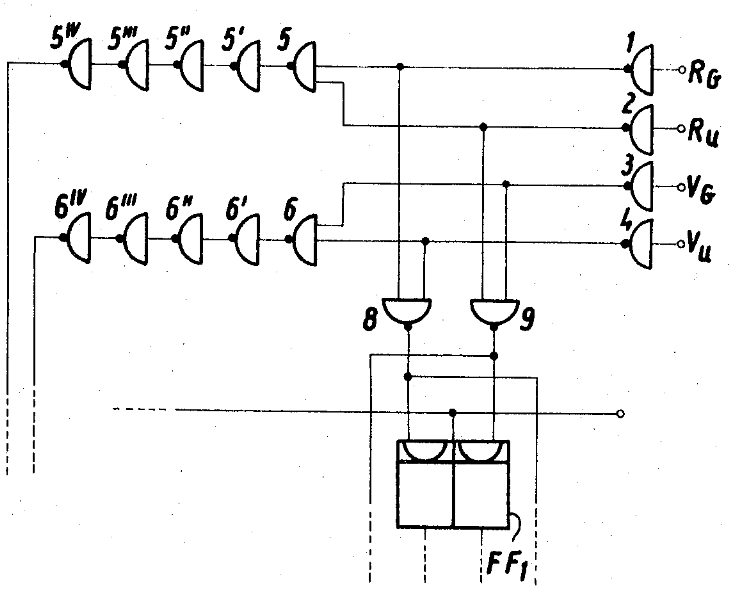
FIG. 5 is a schematic wiring diagram of a modification of the input gate-circuit.

FIG. 5 illustrates another arrangement of the connections of the input gate-circuit EG and the counting direction signal lines to the input counting stage *A*. The inputs of NAND member 8 of input gate-circuit EG are now connected with the outputs of NAND members 1 and 4, and the inputs of NAND member 9 are now connected with the outputs of NAND members 2 and 3. NAND member 5 has connected to the output thereof a series of negators $5'$–$5^{iv}$ acting as delay members, and NAND member 6 has connected thereto a similar series of negators acting as delay members. These insure that a counting direction signal does not reach input counting stage *A* before a respective output signal of input gate-circuit EG.

With the connections of input gate-circuit EG as shown in FIG. 1, the static counter can be charged with such short increments, with very rapidly succeeding direction changes of the position indicator, that a new counting direction signal appears in input counting stage *A* and is there combined with a counting increment originating from the preceding counter direction and fed to the input of the counter. This inconvenience is due to the fact that the transit time of an increment through the input gate-circuit is greater than the transit time of a counting direction signal from NAND members 5 and 6, respectively, to the input counting stage *A*.

In order to avoid this inconvenience, the delay members are inserted into the counting direction signal lines, as shown in FIG. 5, and the input gate-circuit is additionally so connected to the input lines that the respective first increment is suppressed after each change of counting direction. Starting, for example, from the same rest position as in the manner of operation of the static counter described above, the AND condition of NAND member 9 is not satisfied while the AND condition of NAND member 8 is satisfied. This is based on the signals of the line $R_U$, in accordance with the position indicator which is still in rest position and was arrested during backward signaling. The position indicator is now to move in a forward direction, so that an L signal appears on the line $V_G$ as the next increment, as described above, and the L signal on line $R_U$ disappears, as can be seen in FIG. 4. However, due to the type of connection shown in FIG. 5, the AND condition of NAND member 9 is still not satisfied, so that an L signal appears at its output. However, the AND condition is satisfied for NAND member 8, in contrast to the embodiment shown in FIG. 1, so that an O signal appears at the output of NAND member 8 and the AND condition of NAND member 12 is also not satisfied so that an L signal still appears at its output. The AND condition for NAND member 13 is still satisfied, so that an O signal appears at its output. The first increment that reaches the static counter has thus been suppressed, since the counter reading is still zero. If an O signal appears on the line $V_U$ as the next counting increment, the AND condition of NAND member 8 is no longer satisfied and an L signal appears at its output. Thus, the AND condition of NAND member 12 is satisfied and an L signal appears at output $Z_0$ through NAND member 13.

Since one increment is lost with each change of counting direction, the losses cancel each other out in successive changes of counting directions. It is only necessary to determine whether the same counting direction signal appears at the input of the static counter at the end of the counting process as at the start of the counting process. If this is not the case, the counter reading must be corrected by one increment with equal counting direction signals before the start and after the end of the counting process, the unchanged counter reading indicating the correct counting result.

While specific embodiments of the invention have been shown and described to illustrate the application of the principles of the invention, it will be understood that the invention may be embodied otherwise without departing from such principles.

I claim:

1. A static counter for forward and backward counting with selective presetting, comprising, in combination, a plurality of counting stages each having a prestorage and a main storage indicating the counting result of a respective binary digit; a switching stage associated with the first binary digit and providing an indication of each change of state of a counting signal applied to its input; said counting stages being connected serially to each other with the first counting stage being connected to the output of said switching stage; means connecting the storages of each counting stage to inputs of the respective next succeeding counting stage and operable to control the continued counting and the counting direction of such respective next succeeding counting stage in accordance with the switching states of the storages of the respective immediately preceding counting stage; counting direction signal means connected to inputs of only said first counting stage and applying counting direction signals to the latter; and counting signal means connecting said switching stage to inputs of only said first counting stage and controlling counting of the latter in accordance with the counting state of said switching stage.

2. A static counter, as claimed in claim 1, in which said switching stage is an input gate-circuit.

3. A static counter, as claimed in claim 2, including a zero setting input connected to said input gate-circuit and operable to set the latter so that each state of the counting signal can be processed selectively either as an O or as an L signal.

4. A static counter, as claimed in claim 3, including means connecting said zero setting input to inputs of each of said counting stages for resetting of the latter.

5. A static counter, as claimed in claim 2, in which said counting direction signal means comprises counting direction signal lines connected to counting signal inputs; and delay means incorporated in each counting direction signal line between said counting signal inputs and the inputs of said first counting stage.

6. A static counter, as claimed in claim 5, including means connecting said input gate-circuit to said counting signal inputs and operable to suppress the initial counting increment following each change of counting direction.

7. A static counter, as claimed in claim 1, in which said switching stage and each of said counting stages comprise NAND members.

8. A static counter, as claimed in claim 1, in which the internal circuit connections of said first counting stage have a configuration such that the following equations of Boolian algebra are satisfied:

$$Z_{01}=\overline{\overline{((\overline{R}\wedge Z_0\wedge \overline{Z}_1)\,v\,(R\wedge \overline{Z}_0\wedge Z_1))}\wedge V_{e_2}\wedge \overline{Z}_{01}}$$

$$\overline{Z}_{01}=\overline{\overline{((\overline{R}\wedge Z_0\wedge Z_1)\,v\,(R\wedge \overline{Z}_0\wedge \overline{Z}_1))}\wedge V_{e_1}\wedge Z_{01}}$$

$$Z_1=\overline{\overline{((\overline{R}\wedge Z_0\wedge \overline{Z}_{01})\,v\,(R\wedge Z_0\wedge \overline{Z}_{01}))}\wedge V_{e_4}\wedge \overline{Z}_1}$$

$$\overline{Z}_1=\overline{\overline{((R\wedge Z_0\wedge Z_{01})\,v\,(\overline{R}\wedge \overline{Z}_0\wedge \overline{Z}_{01}))}\wedge V_{e_3}\wedge Z_1} \quad (9)$$

the states at the setting inputs of the main storage, $Z_{01}$ and $\overline{Z}_{01}$ indicate the states of the outputs of the prestorage, $Z_1$ and $\overline{Z}_1$ indicate the states of the outputs of the main storage, R and $\overline{R}$ indicate the counting direction signals and $Z_0$ and $\overline{Z}_0$ indicate the states of the outputs of said switching stage connected to inputs of said first counting stage.

9. A static counter, as claimed in claim 8, in which the internal circuitry of all of the counting stages except said first counting stage have a configuration such that the following equations of Boolian algebra are satisfied:

$$Z_{oi}=\overline{\overline{((Z_{o.i-1}\wedge \overline{Z_{i-1}}\wedge Z_i)\,v\,(Z_{o.i-1}\wedge Z_{i-1}\wedge \overline{Z}_i))}\wedge V_{e_2}\wedge \overline{Z_{oi}}}$$

$$\overline{Z_{oi}}=\overline{\overline{((Z_{o.i-1}\wedge \overline{Z_{i-1}}\wedge \overline{Z}_i)\,v\,(Z_{o.i-1}\wedge Z_{i-1}\wedge Z_i))}\wedge V_{e_1}\wedge Z_{oi}}$$

$$Z_i=\overline{\overline{((\overline{Z}_{o.i-1}\wedge \overline{Z_{i-1}}\wedge Z_{oi})\,v\,(\overline{Z}_{o.i-1}\wedge Z_{i-1}\wedge \overline{Z}_{oi}))}\wedge V_{e_4}\wedge \overline{Z_i}}$$

$$\overline{Z_i}=\overline{\overline{((\overline{Z}_{o.i-1}\wedge \overline{Z_{i-1}}\wedge \overline{Z}_{oi})\,v\,(\overline{Z}_{o.i-1}\wedge Z_{i-1}\wedge Z_{oi}))}\wedge V_{e_3}\wedge Z_i} \quad (10)$$

and wherein $Z_{01}$ and $\overline{Z}_{01}$ indicate the states of the outputs of the prestorage of each succeeding counting stage, $Z_i$ and $\overline{Z}_i$ indicate the states of the outputs of the main storage of each succeeding counting stage, $Z_{o.i11}$ and $\overline{Z}_{o.i11}$ indicate the states of the outputs of the prestorage of each succeeding counting stage and $Z_{i-1}$ and $\overline{Z}_{i-1}$ indicate the states of the outputs of the main storage of the respective immediately preceding counting stage.